United States Patent
Conroy et al.

(10) Patent No.: US 7,962,043 B2
(45) Date of Patent: Jun. 14, 2011

(54) MULTICHANNEL OPTICAL TRANSPORT NETWORK SKEW CONTROL

(75) Inventors: Keith Conroy, Perkasie, PA (US); Omer Acikel, San Diego, CA (US); Francesco Caggioni, Winchester, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 617 days.

(21) Appl. No.: 12/143,541

(22) Filed: Jun. 20, 2008

(65) Prior Publication Data

US 2009/0317090 A1 Dec. 24, 2009

(51) Int. Cl.
*H04B 10/00* (2006.01)
*H04B 10/04* (2006.01)

(52) U.S. Cl. .......... 398/152; 398/188; 398/201

(58) Field of Classification Search ............ 398/201, 398/188, 152
See application file for complete search history.

(56) References Cited

U.S. PATENT DOCUMENTS

| 2004/0081470 A1* | 4/2004 | Griffin | 398/188 |
| 2009/0148170 A1* | 6/2009 | Perkins | 398/152 |

* cited by examiner

*Primary Examiner* — Ken N Vanderpuye
*Assistant Examiner* — Amritbir Sandhu
(74) *Attorney, Agent, or Firm* — Law Office of Gerald Maliszewski; Gerald Maliszewski

(57) ABSTRACT

A system and method are provided for controlling time delay in a multichannel optical transport network transmission device. The method accepts a pair of $2^n$-phase shift keying ($2^n$PSK) modulated signals via Ix and Qx electrical signal paths, where n>1, and a pair of $2^p$-PSK modulated signals via Iy and Qy electrical signal paths where p>1. A voltage V1 on the Ix signal path is compared with a voltage V2 on the Qx signal path, and a VOx voltage in generated, which is minimized by adjusting time delay modules in the Ix and Qx signals paths. Likewise, a voltage V3 (Iy) is compared with a voltage V4 (Qy), and a VOy voltage is generated and minimized. Subsequent to minimizing VOx and VOy, the sum of V1 and V2 (V12) is compared with the sum of V3 and V4 (V34), and a VOxy voltage is generated and minimized.

12 Claims, 3 Drawing Sheets

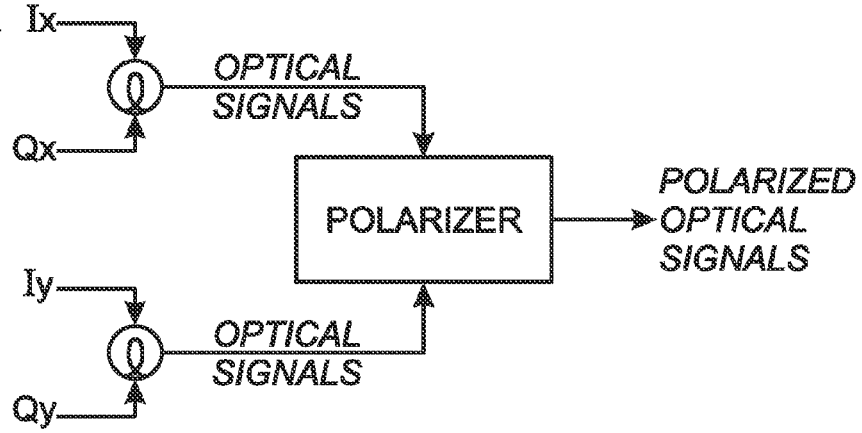
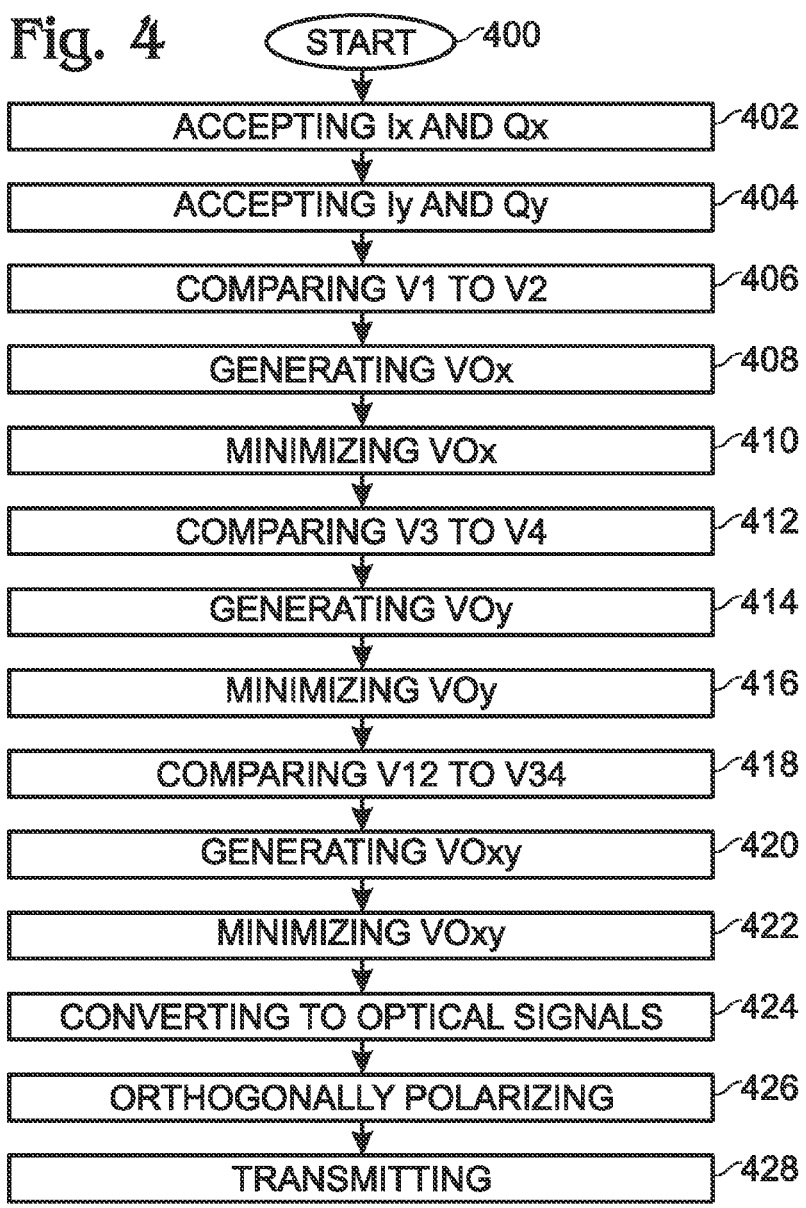

MULTICHANNEL OPTICAL TRANSPORT NETWORK SKEW CONTROL

BACKGROUND OF THE INVENTION

1. Field of the Invention

This invention generally relates to signal communications and, more particularly, to a system and method for minimizing skewing errors in a network using a multi-channel Optical Transport Network (OTN) protocol.

2. Description of the Related Art 100 gigabit per second (Gbps) OTN protocols are being developed where the OTN streams are carried in a "parallel fashion" at a bit-rate greater than 100 Gbps. Until recently, optical signals have been carried using modulations techniques carrying 1 bit per symbol. However, the need for faster signal speeds means that return to zero (RZ), non-return to zero (NRZ), and phase-shift keying (PSK) modulation techniques (1 bit per symbol) are no longer suitable.

FIG. 1 is a schematic diagram depicting a system for the transmission of high speed signals (40/100 Gbps and above) using multiplexed orthogonal optical polarization, with 2 bits per symbol per polarization, for a total of 4 bits/symbol. Any skew (differential time delay) experienced in the modulation of the transmitted signal is translated to the receiver, making the recovery of a serial stream from parallel streams difficult.

It would be advantageous if a technique could be developed to minimize differential time delay or skew in the parallel pathways of a multiplexed orthogonally polarized OTN signal.

SUMMARY OF THE INVENTION

The present invention presents a system and method that address electrical skew control between complex envelope channel components, within and between polarization branches. The invention uses an average voltage measurement technique to calibrate delay through each parallel path.

Accordingly, a method is provided for controlling time delay in a multichannel optical transport network (OTN) transmission device. The method accepts a pair of $2^n$-phase shift keying ($2^n$PSK) modulated signals via Ix and Qx electrical signal paths, where n>1. The method accepts a pair of 2P-PSK modulated signals via Iy and Qy electrical signal paths where p>1. A voltage V1 on the Ix signal path is compared with a voltage V2 on the Qx signal path, and a VOx voltage in generated in response to the comparison. The method minimizes VOx by adjusting time delay modules in the Ix and Qx signals paths. Likewise, a voltage V3 on the Iy signal path is compared with a voltage V4 on the Qy signal path, and a VOy voltage is generated. The VOy voltage is minimized by adjusting time delay modules in the Iy and Qy signals paths.

Subsequent to minimizing VOx and VOy, the sum of V1 and V2 (V12) is compared with the sum of V3 and V4 (V34), and a VOxy voltage is generated in response to comparing V12 to V34. Then, the method minimizes the VOxy voltage by adjusting the time delay between the $2^n$PSK and $2^p$PSK signals. The method further converts the $2^n$PSK and $2^p$PSK signals to $2^n$PSK and $2^p$PSK optical signals, and orthogonally polarizes the $2^n$PSK and $2^p$PSK optical signals for transmission.

Additional details of the above-described method and a system for controlling time delay in a multichannel OTN transmission device are described below.

BRIEF DESCRIPTION OF THE DRAWINGS

FIG. 1 is a schematic diagram depicting a system for the transmission of high speed signals (40/100 Gbps and above) using multiplexed orthogonal optical polarization, with 2 bits per symbol per polarization, for a total of 4 bits/symbol.

FIG. 4 is a flowchart illustrating a method for controlling time delay in a multichannel OTN transmission device.

DETAILED DESCRIPTION

Figure 2:
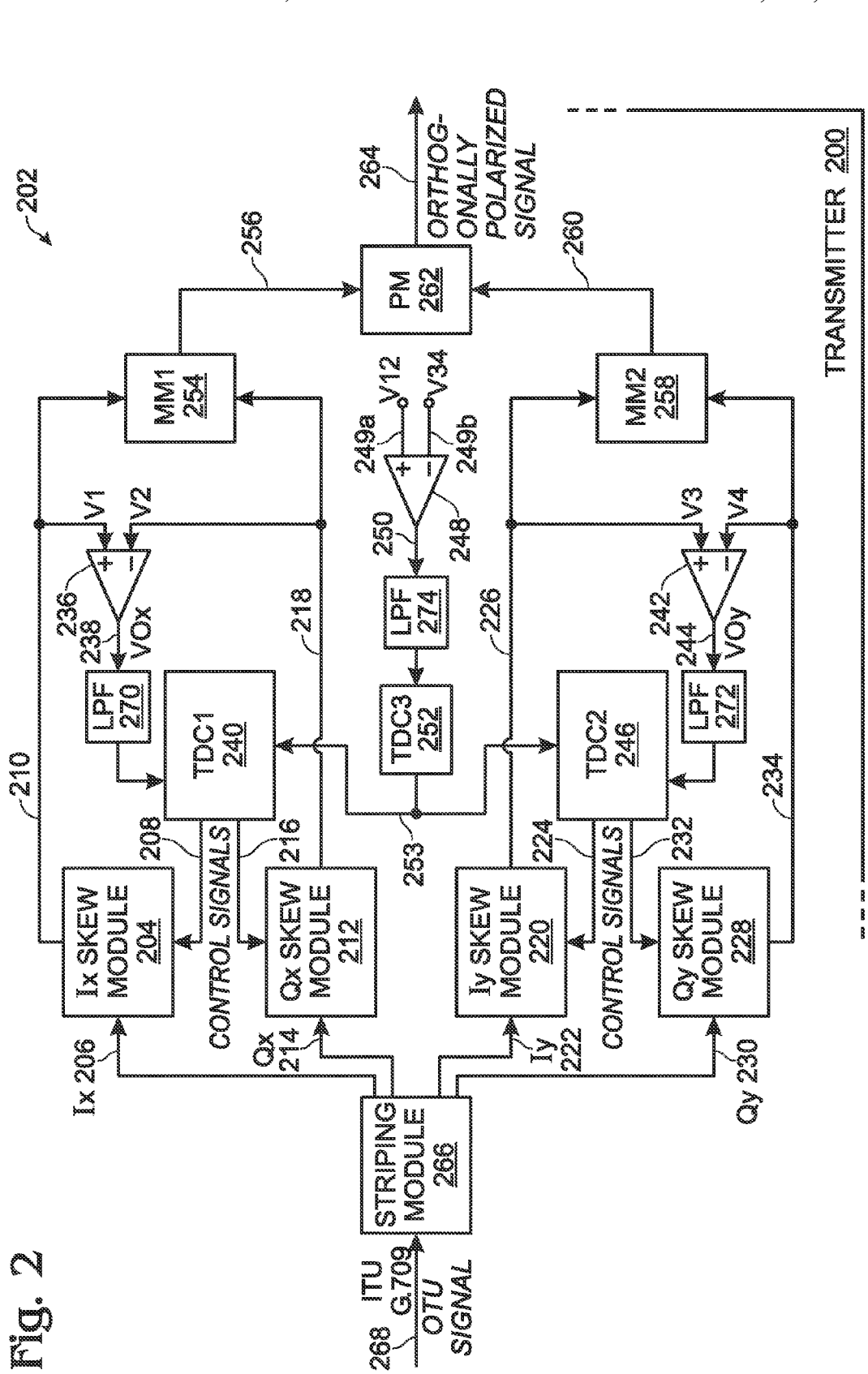
FIG. 2 is a schematic block diagram of a system for controlling time delay in a multichannel optical transport network (OTN) transmission device.

FIG. 2 is a schematic block diagram of a system for controlling time delay in a multichannel optical transport network (OTN) transmission device 200. The system 202 comprises an Ix skew module 204 having an input on line 206 to accept an Ix signal from a pair of $2^n$-phase shift keying ($2^n$PSK) modulated signals, where n>1. In one aspect, n=2. The Ix skew module 204 has a control port on line 208 and an output on line 210 to supply the Ix signal delayed in time in response to signals received at the control port. A Qx skew module 212 has an input on line 214 to accept a Qx signal from the pair of $2^n$PSK modulated signals. The Qx skew module 212 has a control port on line 216 and an output on line 218 to supply the Qx signal delayed in time in response to signals received at the control port.

An Iy skew module 220 has an input on line 222 to accept an Iy signal from a pair of $2^p$-PSK modulated signals, where p>1. In one aspect, p=2. The Iy skew module 220 has a control port on line 224 and an output on line 226 to supply the Iy signal delayed in time in response to signals received at the control port. A Qy skew module 228 has an input on line 230 to accept a Qy signal from the pair of $2^p$PSK modulated signals. The Qy skew module 228 has a control port on line 232 and an output on line 234 to supply the Qy signal delayed in time in response to signals received at the control port.

A first comparator 236 has inputs on lines 210 and 218 to accept a voltage V1 on the Ix signal path and a voltage V2 on the Qx signal path, respectively. The first comparator 236 has an output on line 238 to supply a VOx voltage generated in response to the comparison. A first delay control module 240 (TDC1) has an input on line 238 to accept VOx and an output on lines 208 and 216 to supply signals to the Ix and Qx skew module control ports, respectively. The first delay control module 240 minimizes VOx by adjusting the time delay in the Ix and Qx skew modules.

A second comparator 242 has inputs on lines 226 and 234 to accept a voltage V3 on the Iy signal path and a voltage V4 on the Qy signal path, respectively. The second comparator 242 has an output on line 244 to supply a VOy voltage generated in response to the comparison. A second delay control module 246 (TDC2) has an input on line 244 to accept VOy and an output on lines 224 and 232 to supply signals to the Iy and Qy skew module control ports, respectively. The second delay control module 246 minimizes VOy by adjusting the time delay in the Iy and Qy skew modules.

A third comparator 248 has an input on line 249a to accept a voltage sum of V1+V2=V12 and an input on lines 249b to accept a voltage sum V3+V4=V34. For example, voltages V1 and V2 may be summed by a summing device (not shown) and supplied on line 249a. The third comparator 248 has an output on line 250 to supply a VOxy voltage generated in response to the comparison. A third delay control module 252 (TDC3) has an input on line 250 to accept VOxy and an output on line 253 to supply control signals to the first and second time delay control modules. The third delay control module 252 minimizes VOxy by adjusting the Ix, Qx, Iy, and Qy signal paths through the first and second time delay control modules, subsequent to the first and second delay control modules minimizing VOx and VOy, respectively. Alternately but not shown, the third delay control module may control the Ix, Qx, Iy, and Qy channels independent of the first and second TDCs. As another alternative (not shown), a single TDC may be used to minimize VOx, VOy, and VOxy.

The system 202 further comprises a first modulation module (MM1) 254 (e.g., a Mach-Zehnder modulator) to accept the delayed Ix and Qx signals on lines 210 and 218, respectively. The first modulation module has an output on line 256 to supply a $2^n$PSK optical signal. A second modulation module 258 (MM2) accepts the delayed Iy and Qy signals on lines 226 and 234, respectively, and supplies a $2^p$PSK optical signal on line 260. A polarization multiplexer (PM) 262 has inputs on lines 256 and 260 to accept the $2^n$PSK and $2^p$PSK optical signals, respectively, and an output on line 264 to supply orthogonally polarized $2^n$PSK and $2^p$PSK optical signals for transmission.

Typically, the system 202 further comprises a striping module 266 that accepts an ITU G.709 OTN signal on line 268. Striping module 266 performs multiplex processing to provide four parallel paths carrying the $2^n$PSK and $2^p$PSK electrical signals on lines 206, 214, 222, and 230. In the system shown, deskewing operations are performed between the modulation and polarization functions. In other aspects not shown, deskewing calibrations may be performed prior to modulation, or both before and after modulation of the electronic signals.

The serial OTN signal on line 268 is typically a pseudo-random signal (e.g., a NRZ signal) with an average voltage about equal to the midpoint between the signal logic high and logic low values. Therefore, each skew module 204, 212, 220, and 228 accepts a signal representing an approximately equal number of "1" and "0" data bits. In one aspect as shown, the first delay control module 240 minimizes an average VOx voltage, while the second delay control module 246 minimizes an average VOy voltage. Low pass filters (LPFs) 270, 272, and 274 are shown to represent the use average voltages.

As shown, the first comparator 236 accepts V1 at a positive voltage comparator node and V2 at a negative voltage comparator node. Then, the first delay control module 240 minimizes VOx by increasing the delay in the Ix signal path, decreasing the delay in the Qx signal path, or a combination of the above-mentioned operations, in response to a positive VOx value. In response to a negative VOx value, the first delay control module 240 decreases the delay in the Ix signal path, increases the delay in the Qx signal path, or combines the above-mentioned operations. Alternately but not shown, if V1 is connected to the negative voltage node and V2 to the positive, the operations performed by the first delay module would be reversed from the ones described above.

Likewise, the second comparator 242 accepts V3 at a positive voltage comparator node and V4 at a negative voltage comparator node. The second delay control module 246 minimizes VOy by increasing the delay in the Iy signal path, decreasing the delay in the Qy signal path, or a combination of the above-mentioned operations, in response to a positive VOy value. In response to a negative VOy value, the second delay control module 246 decreases the delay in the Iy signal path, increases the delay in the Qy signal path, or combines the above-mentioned operations.

As shown, the third comparator 248 accepts V12 at a positive voltage comparator node and V34 at a negative voltage comparator node. The third delay control module 252 minimizes VOxy by increasing the delay in polarization pair Ix and Qx signal paths, decreasing the delay in polarization pair Iy and Qy signal paths, or a combination of the above-mentioned operations, in response to a positive VOxy value. In response to a negative VOxy value, the third delay control module decreases the delay in polarization pair Ix and Qx signal paths, increases the delay in polarization pair Iy and Qy signal paths, or combines the above-mentioned operations.

Functional Description

Figure 3:
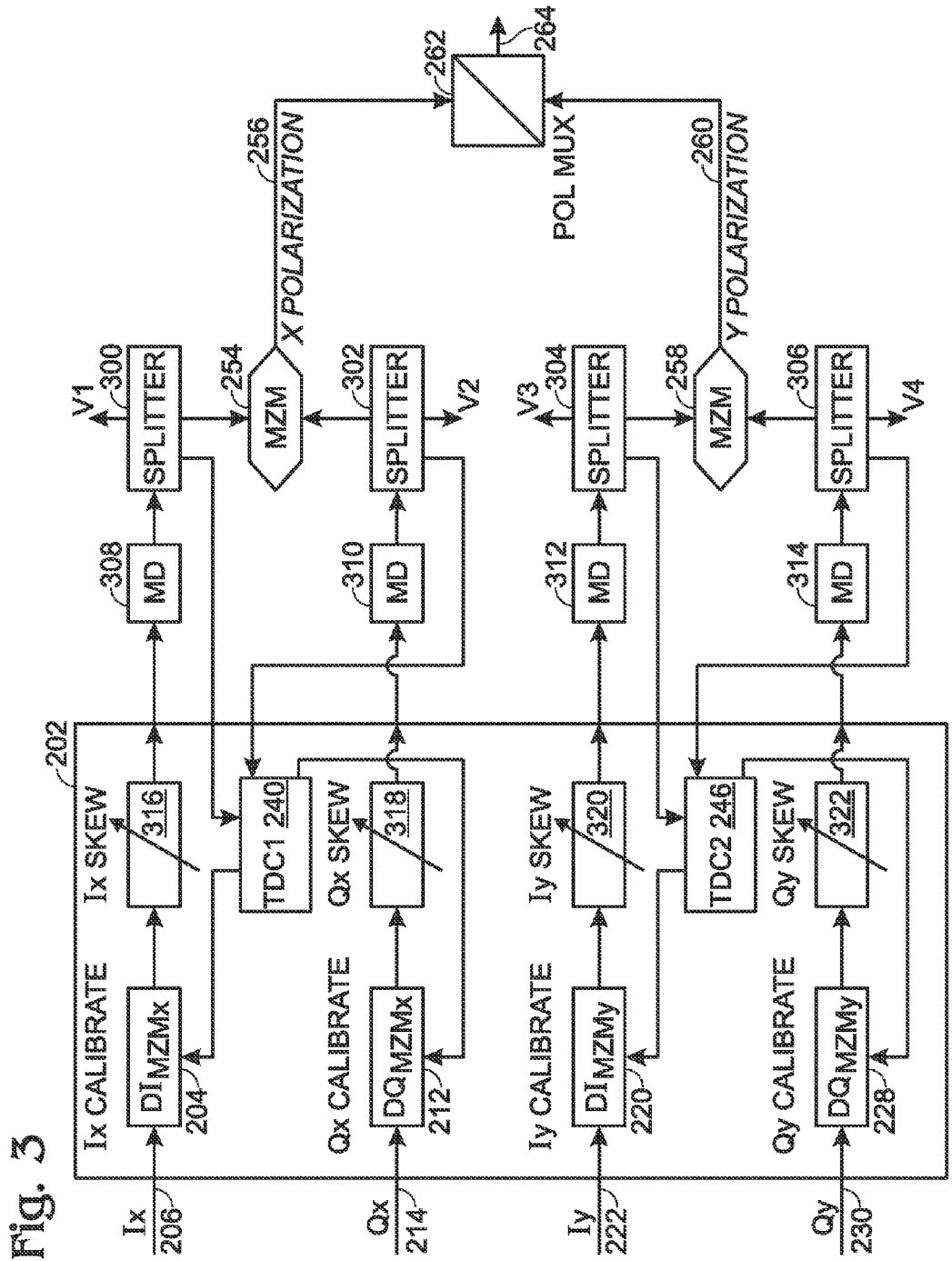
FIG. 3 is a schematic block diagram showing aspects of the system of FIG. 2.

FIG. 3 is a schematic block diagram showing aspects of the system of FIG. 2. The skew control is additionally enabled through the use of splitters 300, 302, 304, and 306. Also shown are modulation drivers (MDs) 308, 310, 312, and 314. Boxes 316, 318, 320, and 322 represent time delay in the respective channels Ix, Qx, Iy, and Qy. The skew between I and Q channels for each polarization is adjusted by driving the MD signal difference, as sampled by the splitters, to zero. For example, V1−V2, between Ix and Qx channels is driven to zero. Once V1−V2~0 and V3−V4~0, the VOxy output generated from input signal (V1+V2)−(V3−V4) is driven to zero by adjusting both channel signals for one of the polarizations, I and Q, in the same direction by the same amount. Due to the limited range of available skew for a given channel, achieving the desired result may require adjusting both channels in opposite directions. For example, to adjust VOx, it may be necessary to adjust the delay in both the Ix and Qx channels.

FIG. 4 is a flowchart illustrating a method for controlling time delay in a multichannel OTN transmission device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 400.

Step 402 accepts a pair of $2^n$-phase shift keying ($2^n$PSK) modulated signals via Ix and Qx electrical signal paths, where n>1. Step 404 accepts a pair of $2^p$-PSK modulated signals via Iy and Qy electrical signal paths where p>1. Step 406 compares a voltage V1 on the Ix signal path with a voltage V2 on the Qx signal path. Step 408 generates a VOx voltage in response to the comparison. Step 410 minimizes VOx by adjusting time delay modules in the Ix and Qx signals paths. Step 412 compares a voltage V3 on the Iy signal path with a voltage V4 on the Qy signal path. Step 414 generates a VOy voltage in response to the comparison. Step 416 minimizes VOy by adjusting time delay modules in the Iy and Qy signals paths. Subsequent to minimizing VOx and VOy, Step 418 compares the sum of V1 and V2 (V12) with the sum of V3 and V4 (V34). Step 420 generates a VOxy voltage in response to comparing V12 to V34. Step 422 minimizes VOxy by adjusting the time delay between the $2^n$PSK and $2^p$PSK signals.

In one aspect, Step 424 converts the $2^n$PSK and $2^p$PSK signals to $2^n$PSK and $2^p$PSK optical signals. Step 426 orthogonally polarizes the $2^n$PSK and $2^p$PSK optical signals. Step 428 transmits the orthogonally polarized signals.

In another aspect, accepting the pair of $2^n$PSK modulated signals in Step 402 includes each signal path accepting signals representing an approximately equal number of "1" and "0" data bits. Likewise, accepting the pair of $2^p$PSK modulated signals in Step 404 includes each signal path accepting signals representing an approximately equal number of "1" and "0" data bits. Then, minimizing VOx in Step 410 includes minimizing an average VOx voltage, and minimizing VOy in Step 416 includes minimizing an average VOy voltage.

In one aspect, comparing V1 to V2 in Step 406 includes providing the V1 voltage to a positive node of a voltage comparator device, and providing the V2 voltage to a negative node of a voltage comparator device. Then, minimizing VOx (Step 410) by adjusting time delay modules in the Ix and Qx signals paths includes increasing the delay in the Ix signal path, decreasing the delay in the Qx signal path, or a combination of the above-mentioned operations, in response to a positive VOx value. In response to a negative VOx value, Step 410 decreases the delay in the Ix signal path, increases the delay in the Qx signal path, or combines the above-mentioned operations.

In a different aspect, comparing V3 to V4 in Step 412 includes providing the V3 voltage to a positive node of a voltage comparator device, and providing the V4 voltage to a negative node of a voltage comparator device. Then, minimizing VOy by adjusting time delay modules in the Iy and Qy signals paths (Step 416) includes increasing the delay in the Iy signal path, decreasing the delay in the Qy signal path, or a combination of the above-mentioned operations, in response to a positive VOy value. In response to a negative VOy value, Step 416 decreases the delay in the Iy signal path, increases the delay in the Qy signal path, or combines the above-mentioned operations.

In another aspect, comparing V12 to V34 in Step 418 includes providing the V12 voltage to a positive node of a voltage comparator device, and providing the V34 voltage to a negative node of a voltage comparator device. Then, minimizing VOxy by adjusting the time delay between the 2″PSK and $2^p$PSK signals in Step 422 includes increasing the delay in polarization pair Ix and Qx signal paths, decreasing the delay in polarization pair Iy and Qy signal paths, or a combination of the above-mentioned operations, in response to a positive VOxy value. In response to a negative VOxy value, Step 422 decreases the delay in polarization pair Ix and Qx signal paths, increases the delay in polarization pair Iy and Qy signal paths, or combines the above-mentioned operations.

A system and method have been provided for controlling time delay in a multichannel optical transport network (OTN) transmission device. Explicit circuit details and process steps have been given as examples to illustrate the invention. However, the invention is not necessarily limited to these examples. Other variations and embodiments of the invention will occur to those skilled in the art.

We claim:

1. A method for controlling time delay in a multichannel optical transport network (OTN) transmission device, the method comprising:
   accepting a pair of 2″-phase shift keying (2″PSK) modulated signals via Ix and Qx electrical signal paths, where n>1;
   accepting a pair of $2^p$-PSK modulated signals via Iy and Qy electrical signal paths where p>1;
   comparing a voltage V1 on the Ix signal path with a voltage V2 on the Qx signal path;
   generating a VOx voltage in response to the comparison;
   minimizing VOx by adjusting time delay modules in the Ix and Qx signals paths;
   comparing a voltage V3 on the Iy signal path with a voltage V4 on the Qy signal path;
   generating a VOy voltage in response to the comparison;
   minimizing VOy by adjusting time delay modules in the Iy and Qy signals paths;
   subsequent to minimizing VOx and VOy, comparing the sum of V1 and V2 (V12) with the sum of V3 and V4 (V34);
   generating a VOxy voltage in response to comparing V12 to V34; and,
   minimizing VOxy by adjusting the time delay between the 2″PSK and $2^p$PSK signals.

2. The method of claim 1 further comprising:
   converting the 2″PSK and $2^p$PSK signals to 2″PSK and $2^p$PSK optical signals;
   orthogonally polarizing the 2″PSK and $2^p$PSK optical signals; and,
   transmitting the orthogonally polarized signals.

3. The method of claim 1 wherein accepting the pair of 2″PSK modulated signals includes each signal path accepting signals representing an approximately equal number of "1" and "0" data bits;
   wherein accepting the pair of $2^p$PSK modulated signals includes each signal path accepting signals representing an approximately equal number of "1" and "0" data bits;
   wherein minimizing VOx includes minimizing an average VOx voltage; and,
   wherein minimizing VOy includes minimizing an average VOy voltage.

4. The method of claim 3 wherein comparing V1 to V2 includes:
   providing the V1 voltage to a positive node of a voltage comparator device;
   providing the V2 voltage to a negative node of a voltage comparator device;
   wherein minimizing VOx by adjusting time delay modules in the Ix and Qx signals paths includes:
   in response to a positive VOx value performing an operation selected from a group consisting of increasing the delay in the Ix signal path, decreasing the delay in the Qx signal path, and a combination of the above-mentioned operations; and,
   in response to a negative VOx value performing an operation selected from a group consisting of decreasing the delay in the Ix signal path, increasing the delay in the Qx signal path, and a combination of the above-mentioned operations.

5. The method of claim 3 wherein comparing V3 to V4 includes:
   providing the V3 voltage to a positive node of a voltage comparator device;
   providing the V4 voltage to a negative node of a voltage comparator device;
   wherein minimizing VOy by adjusting time delay modules in the Iy and Qy signals paths includes:
   in response to a positive VOy value performing an operation selected from a group consisting of increasing the delay in the Iy signal path, decreasing the delay in the Qy signal path, and a combination of the above-mentioned operations; and,
   in response to a negative VOy value performing an operation selected from a group consisting of decreasing the delay in the Iy signal path, increasing the delay in the Qy signal path, and a combination of the above-mentioned operations.

6. The method of claim 3 wherein comparing V12 to V34 includes:
   providing the V12 voltage to a positive node of a voltage comparator device;
   providing the V34 voltage to a negative node of a voltage comparator device;
   wherein minimizing VOxy by adjusting the time delay between the 2″PSK and $2^p$PSK signals includes:
   in response to a positive VOxy value performing an operation selected from a group consisting of increasing the delay in polarization pair Ix and Qx signal paths, decreasing the delay in polarization pair Iy and Qy signal paths, and a combination of the above-mentioned operations; and, in response to a negative VOxy value performing an operation selected from a group consisting of decreasing the delay in polarization pair Ix and Qx signal paths, increasing the delay in polarization pair Iy and Qy signal paths, and a combination of the above-mentioned operations.

7. A system for controlling time delay in a multichannel optical transport network (OTN) transmission device, the system comprising:
an Ix skew module having an input to accept an Ix signal from a pair of $2^n$-phase shift keying ($2^n$PSK) modulated signals, where n>1, the Ix skew module having a control port and an output to supply the Ix signal delayed in time in response to signals received at the control port;
a Qx skew module having an input to accept an Qx signal from the pair of $2^n$PSK modulated signals, the Qx skew module having a control port and an output to supply the Qx signal delayed in time in response to signals received at the control port;
an Iy skew module having an input to accept an Iy signal from a pair of $2^p$-PSK modulated signals, where p>1, the Iy skew module having a control port and an output to supply the Iy signal delayed in time in response to signals received at the control port;
a Qy skew module having an input to accept an Qy signal from the pair of $2^p$PSK modulated signals, the Qy skew module having a control port and an output to supply the Qy signal delayed in time in response to signals received at the control port;
a first comparator having inputs to accept a voltage V1 on the Ix signal path and a voltage V2 on the Qx signal path, and an output to supply a VOx voltage generated in response to the comparison;
a first delay control module having an input to accept VOx and an output to supply signals to the Ix and Qx skew module control ports, the first delay control module minimizing VOx by adjusting the time delay in the Ix and Qx skew modules;
a second comparator having inputs to accept a voltage V3 on the Iy signal path and a voltage V4 on the Qy signal path, and an output to supply a VOy voltage generated in response to the comparison;
a second delay control module having an input to accept VOy and an output to supply signals to the Iy and Qy skew module control ports, the second delay control module minimizing VOy by adjusting the time delay in the Iy and Qy skew modules;
a third comparator having inputs to accept a voltage sum of V1+V2=V12 and a voltage sum V3+V4=V34, and an output to supply a VOxy voltage generated in response to the comparison; and,
a third delay control module having an input to accept VOxy and an output connected to the first and second time delay control modules to supply control signals for adjusting the time delay in the Ix, Qx, Iy, and Qy signal paths, subsequent to the first and second delay control modules minimizing VOx and VOy, respectively.

8. The system of claim 7 further comprising:
a first modulation module to accept the delayed Ix and Qx signals, and an output to supply a $2^n$PSK optical signal;
a second modulation module to accept the delayed Iy and Qy signals, and supply a $2^p$PSK optical signal; and,
a polarization multiplexer having inputs to accepts the $2^n$PSK and $2^p$PSK optical signals and an output to supply orthogonally polarized $2^n$PSK and $2^p$PSK optical signals for transmission.

9. The system of claim 7 wherein each skew module accepts a signal representing an approximately equal number of "1" and "0" data bits;
wherein the first delay control module minimizes an average VOx voltage; and,
wherein the second delay control module minimizes an average VOy voltage.

10. The system of claim 9 wherein the first comparator accepts V1 at a positive voltage comparator node and V2 at a negative voltage comparator node;
wherein the first delay control module minimizes VOx by:
performing an operation selected from a group consisting of increasing the delay in the Ix signal path, decreasing the delay in the Qx signal path, and a combination of the above-mentioned operations, in response to a positive VOx value; and,
performing an operation selected from a group consisting of decreasing the delay in the Ix signal path, increasing the delay in the Qx signal path, and a combination of the above-mentioned operations, in response to a negative VOx value.

11. The system of claim 9 wherein the second comparator accepts V3 at a positive voltage comparator node and V4 at a negative voltage comparator node;
wherein the second delay control module minimizes VOy by:
performing an operation selected from a group consisting of increasing the delay in the Iy signal path, decreasing the delay in the Qy signal path, and a combination of the above-mentioned operations, in response to a positive VOy value; and,
performing an operation selected from a group consisting of decreasing the delay in the Iy signal path, increasing the delay in the Qy signal path, and a combination of the above-mentioned operations, in response to a negative VOy value.

12. The system of claim 9 wherein the third comparator accepts V12 at a positive voltage comparator node and V34 at a negative voltage comparator node;
wherein the third delay control module minimizes VOxy by:
performing an operation selected from a group consisting of increasing the delay in polarization pair Ix and Qx signal paths, decreasing the delay in polarization pair Iy and Qy signal paths, and a combination of the above-mentioned operations, in response to a positive VOxy value; and,
performing an operation selected from a group consisting of decreasing the delay in polarization pair Ix and Qx signal paths, increasing the delay in polarization pair Iy and Qy signal paths, and a combination of the above-mentioned operations, in response to a negative VOxy value.

* * * * *